United States Patent
Al-Jlil

(10) Patent No.: US 9,382,133 B2
(45) Date of Patent: Jul. 5, 2016

(54) ADSORBENT COMPOSITE FROM NATURAL RAW MATERIALS TO REMOVE HEAVY METALS FROM WATER

(71) Applicant: Saad A Al-Jlil, Riyadh (SA)

(72) Inventor: Saad A Al-Jlil, Riyadh (SA)

(73) Assignee: KING ABDULAZIZ CITY FOR SCIENCE AND TECHNOLOGY (KACST), Riyadh (SA)

( * ) Notice: Subject to any disclaimer, the term of this patent is extended or adjusted under 35 U.S.C. 154(b) by 172 days.

(21) Appl. No.: 13/848,129

(22) Filed: Mar. 21, 2013

(65) Prior Publication Data

US 2014/0284281 A1  Sep. 25, 2014

(51) Int. Cl.
| | |
|---|---|
| *C02F 1/28* | (2006.01) |
| *B01J 20/12* | (2006.01) |
| *B01J 20/24* | (2006.01) |
| *B01J 20/04* | (2006.01) |
| *B01J 20/30* | (2006.01) |
| *B01J 20/28* | (2006.01) |
| *B01J 20/10* | (2006.01) |
| *B01J 20/26* | (2006.01) |
| *C02F 101/20* | (2006.01) |

(52) U.S. Cl.
CPC ............. *C02F 1/288* (2013.01); *B01J 20/043* (2013.01); *B01J 20/103* (2013.01); *B01J 20/12* (2013.01); *B01J 20/24* (2013.01); *B01J 20/262* (2013.01); *B01J 20/28004* (2013.01); *B01J 20/3007* (2013.01); *B01J 20/3021* (2013.01); *B01J 20/3078* (2013.01); *B01J 2220/46* (2013.01); *C02F 1/281* (2013.01); *C02F 1/286* (2013.01); *C02F 2101/20* (2013.01); *Y10T 428/2982* (2015.01)

(58) Field of Classification Search
None
See application file for complete search history.

(56) References Cited

U.S. PATENT DOCUMENTS

| | | | |
|---|---|---|---|
| 4,133,755 A | 1/1979 | Tarao et al. | |
| 4,387,653 A * | 6/1983 | Voss ................. | B01D 53/508 110/342 |
| 5,256,615 A | 10/1993 | Oomura et al. | |
| 5,667,694 A | 9/1997 | Cody et al. | |
| 8,017,549 B2 * | 9/2011 | Herfert .............. | A61F 13/53 428/402 |
| 2005/0004541 A1* | 1/2005 | Roberts ............. | B32B 5/28 604/367 |
| 2005/0230659 A1* | 10/2005 | Hampden-Smith ..... | C01B 3/326 252/189 |
| 2010/0093949 A1* | 4/2010 | Herfert .............. | A61F 13/53 525/451 |
| 2010/0129454 A1* | 5/2010 | Ortiz Niembro ..... | A01K 13/001 424/489 |
| 2012/0152838 A1* | 6/2012 | Al-Jlil .............. | B01D 5/006 210/638 |

FOREIGN PATENT DOCUMENTS

WO  WO0072958  12/2000

* cited by examiner

*Primary Examiner* — Joseph D Anthony
(74) *Attorney, Agent, or Firm* — Geeta Kadambi; Riddhi IP LLC

(57) ABSTRACT

An adsorbent composition for removing heavy metals from contaminated water is described. The composition comprises of a mixture of kaolin clay, cellulose powder, silica powder, magnesite powder, bentonite powder and water. The adsorbent is mixed with contaminated water and allowed to react. Once the reaction is finished a reduced contaminant containing water is gathered and reused.

18 Claims, 1 Drawing Sheet

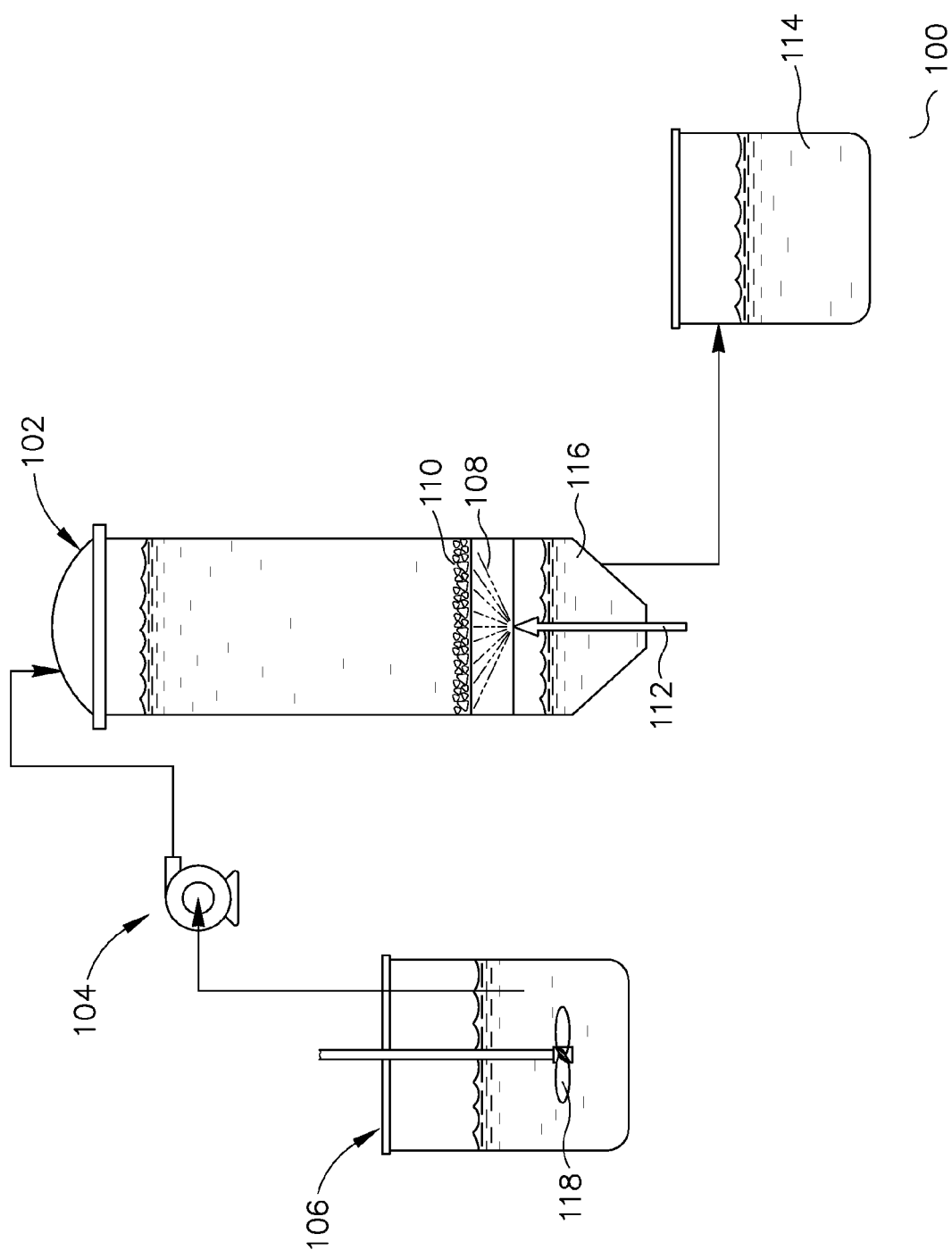

ADSORBENT COMPOSITE FROM NATURAL RAW MATERIALS TO REMOVE HEAVY METALS FROM WATER

FIELD OF TECHNOLOGY

This disclosure relates generally to an adsorbent for removing heavy metals from contaminated water, and more particularly, to a process for decontaminating a heavy metal contaminated stream of water.

BACKGROUND

In the area of water treatment, such as ground water or industrial waste water treatment, there is an ever-increasing need to remove undesirable and even toxic contaminants, particularly heavy metal contaminants, from water. Many industrial processes utilize aqueous solutions of heavy metals, such as lead in the manufacture of batteries, and chromium or copper in electroplating solutions.

Unfortunately, the removal of such heavy metals from the aqueous solutions used in these processes has proven to be not only difficult but expensive. Prior art processes have utilized different types of adsorbents, such as activated carbon, activated sludge, various types of natural clays, carbon aerogels, coirpith carbon, natural zeolites and even date pits. Likewise, heavy metal removal can be accomplished through expensive ion exchange resins.

Tarao et al. (U.S. Pat. No. 4,133,755) discloses agents for removing heavy metals comprising a composition consisting mainly of a dithiocarbamate bond-containing low molecular weight compound, amorphous silica and activated carbon powder, granulated with a vinyl acetate polymer binder and clay as a thixotropic excipient. Tarao et al. disclose packing the granulated materials into columns for treating mercury-contaminated waste water.

Cody et al. (U.S. Pat. No. 5,667,694) discloses a process for removing dissolved heavy metals including lead and radioactive contaminants from contaminated aqueous systems including aqueous soil systems. An organically modified smectite clay, or organoclay, is used to treat these systems. Organoclays are the reaction product of smectite clays and quaternary ammonium compounds. The organoclay is brought in contact with system to be treated where it absorbs the heavy metal in the aqueous system onto the organoclay which absorbed complex is then removed by a variety of methods including flotation and air sparging.

Oomura et al. (U.S. Pat. No. 5,256,615), discloses a granular inorganic ion exchanger which is obtained by firing at 400° C. or higher a granular molded product of a mixture of a metal alkoxide such as $Si(OMe)_4$ or hydrolyzate thereof, a clay mineral such as sepiolite and an inorganic ion exchanger such as antimony pentoxide and which has mechanical strength and heat resistance without losing its inherent ion exchangeability.

Payzant et al. (WO0072958) discloses a networked polymer/clay alloy produced from a monomer/clay mixture comprising a monomer, a cross-linking agent and clay particles. The clay is chemically integrated with the polymer such that, on exposure to water, the networked polymer/clay alloy swells with substantially no clay separating from the alloy.

However, none of the above-discussed references discloses or suggests a relatively inexpensive but highly effective adsorbent composition for removal of heavy metal contaminants from contaminated water streams. Accordingly, there exists a need in the art to overcome the deficiencies and limitations described hereinabove.

SUMMARY

In accordance with aspects of the invention, the invention is directed to an adsorbent composition and for using the same to remove metal ions from waste water. In one embodiment the adsorbent composition comprises of kaolin clay, cellulose powder, silica powder, magnesite powder, bentonite powder and water.

In one embodiment, a new adsorbent composition comprises of kaolin clay 63.476%, cellulose 1.544 wt %, silica 4.078 wt %, magnesite 9.546 wt %, bentonite 0.772 wt % and water 20.584 wt %.

In another embodiment, the invention is directed to a method for removing heavy metals from contaminated water, comprising mixing a water having a concentration of one or more heavy metals with an adsorbent composition comprising granules of a mixture of kaolin clay 63.476%, cellulose 1.544 wt %, silica 4.078 wt %, magnesite 9.546 wt %, bentonite 0.772 wt % and water 20.584 wt %; and collecting water that has a reduced concentration of the heavy metal(s) after treatment.

In one embodiment, an adsorbent composition for metal ions is provided, comprising a granulated mixture of of kaolin clay 63.476%, cellulose 1.544 wt %, silica 4.078 wt %, magnesite 9.546 wt %, bentonite 0.772 wt % and water 20.584 wt %. The clay has ion-exchange capacity. The clay is bentonite clay in addition to kaolin clay. The size of the new composite absorbant range from 0.125 mm to 0.25 mm.

In another embodiment, a method is provided for removing heavy metals from contaminated water. The method comprises mixing a water having a concentration of one or more heavy metals with an adsorbent composition comprising granules of a mixture of of kaolin clay 63.476%, cellulose 1.544 wt %, silica 4.078 wt %, magnesite 9.546 wt %, bentonite 0.772 wt % and water 20.584 wt %.

In another embodiment, the method further comprises collecting water having a reduced concentration of the one or more heavy metals. The process is conducted at a pH>4. The mixing step is conducted at a pH between 4 and 5. The adsorbent composition is a mixture of of kaolin clay 63.476%, cellulose 1.544 wt %, silica 4.078 wt %, magnesite 9.546 wt %, bentonite 0.772 wt % and water 20.584 wt %. The one or more heavy metals are selected from the group consisting of lead, chromium, copper, zinc, cadmium and combinations thereof. A concentration of the one or more heavy metals in the water is 1009 ppm. The one or more heavy metals are lead, and the concentration of lead in the water is reduced by 100%.

The composition and methods disclosed herein may be implemented in any means for achieving various aspects, and may be executed manually or automated using a computer. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 1 shows the adsorption system 100 which consists of a tank with stirrer for mixing the adsorbent with heavy metal ions solution followed by a fritted membrane fixed in a column to separate the adsorbent from the mixed effluent.

DETAILED DESCRIPTION

In the instant disclosure several compositions and methods for cleaning water and removal of metal ions are disclosed. Although the present embodiments have been described with reference to specific example embodiments, it will be evident that various modifications and changes may be made to these embodiments without departing from the broader spirit and scope of the various embodiments.

The invention relates to a new composite adsorbent composition for removing heavy metals from contaminated water, and more particularly, to a process for reducing the concentration of a heavy metal as a contaminant in a water stream.

FIG. 1 shows a batch adsorption system 100 including a tank with stirrer 118 to mix the heavy metal solution with the adsorbent follows by fritted membrane fixed in a column 102 for further purification of water and to separate the adsorbent from the water. In this process, the heavy metal solution is introduced to a batch adsorption system including tank-fritted membrane system 110 for removing the heavy metal ions from wastewater. When the heavy metal solution is introduced to a batch adsorption unit 106 which contains adsorbents the adsorbents are mixed in the contaminated wastewater and mixed (stirred) 118 at a temperature and time sufficient to result in thorough contact between the wastewater and the adsorbents. The pH of the mixture in the adsorption unit is maintained between pH 4 and pH 5, preferably pH 4.5. Subsequently, the treated water is forwarded through pump 104 to a column with fritted membrane 102 to separate the clean water 114 from the adsorbents for more purification and is distributed downstream for various beneficial uses. In addition, air spargers 112 are used frequently for back wash 108 and clean the fritted membrane surface 110 from the deposition of the adsorbent and move it back to the tank.

The fritted membrane that is used in the present examples is a Bibby sterilin, 65 mm Pyrex® sintered disc, with porosity=12.28% (grade No. 5) and pore index between 4 microns and 10 microns (available from Bibby sterilin Ltd stone, staffs, St 15 OSA, England).

Pyrex® borosilicate glass disc membranes have good chemical and thermal characteristics. Pyrex® borosilicate glass has a good chemical resistance to attack from acids, halogens, salt solutions and organic solvents. Also, Pyrex® has good thermal properties as a result of its low expansion coefficient and high softening point.

However, the fritted membranes suitable for use with the present invention can also be made from other materials, for example ceramic materials, such as alumina, silica or the like in combination with a binder, or even from other glasses, so long as the final fritted membrane has a porosity close that of those disclosed above.

Cellulose powder is used in the adsorbent composite. The surface of the cellulose in contact with water is negatively charged (In "The physical chemistry of dyeing". *Oliver and Boyd, London,* 1954, by Vickerstaff, T.). The cationic heavy metals such as lead will undergo attraction on approaching the anionic cellulose structure. The negative charge on the cellulose will attract the metal ions. Therefore, the electrostatic forces between the metal ions and the surface of the cellulose are important to this composite.

Naturally occurring clay has been known for use in treating water contaminated with heavy metals, since clay also have an inherent ion-exchange capacity. For example, clay minerals have been found to be in the form of layered molecular structures, often having variable amounts of iron, magnesium, alkali metals, alkaline earths and other such cations sandwiched between the layers. This structure enables the composite to perform cation exchange with heavy metal cations in aqueous solution.

In "Saudi Arabian clays for lead removal in wastewater", *Applied Clay Science,* 42:671-674 (2009), by S. A. Al-Jlil and F. D. Alsewailem, incorporated by reference herein in its entirety, several naturally occurring Saudi Arabian clay materials were tested for lead adsorption efficiency from wastewater in batch processes. In some experiments, pretreatment of the clay with hydrochloric acid was found to increase lead adsorption efficiency, while other clays performed better in the absence of pretreatment. Additionally, adsorption efficiency was demonstrated to increase with increasing pH.

Bentonite clays are well known in the art and readily available in Saudi Arabia. Natural clays usually consist of mixtures of minerals consisting of the oxides of silica and alumina. Bentonite clay is a mineral clay containing montmorillonite as the major mineral in its structure with small amounts of other minerals, such as kaolinite and illite. Montmorillonite is the only mineral in the mixture that can expand and is expected to do most of the adsorption. Mineralogical analysis shows that Saudi bentonite consists of 80% montmorillonite as a minimum, 10% kaolinite and 10% combined illite and quartz as a maximum. The results of the analysis by XRF method are shown below. Mineralogical analysis was accomplished by x-ray diffraction (XRD). The specific pore volume, solid particle density and porosity values are equal to 0.0778 cm$^3$/g, 2.6253 g/cm$^3$ and 0.17, respectively. These values were measured by Micromeritics Material Analysis Laboratory (Norcross, Ga., U.S.A.) using the gas pycnometry method (Accupc 1330 pycnometer). The chemical analysis of Saudi bentonite clay is as shown below.

TABLE 1

Chemical analysis of Saudi bentonite clay by XRF (wt %)

| Compound | wt % in Clay |
|---|---|
| $SiO_2$ | 55.0 ± 3.0 |
| $Al_2O_3$ | 22.0 ± 2.0 |
| $TiO2$ | 1.5 ± 0.25 |
| $Fe_2O_3$ | 5.67 ± 0.5 |
| MgO | 2.30 ± 0.45 |
| CaO | <2.00 |
| $Na_2O$ | <2.00 |
| $K_2O$ | <1.00 |
| $P_2O_5$ | <0.20 |
| $SO^-_3$ | 0.002 |
| $Cl^-$ | 0.2 |
| $Cr_2O_3$ | 0.02 |
| $Mn_2O_3$ | 0.03 |
| Loss On Ignition | 9.80 |

New Adsorbent composite preparation: Kaolin clay is milled to a size between 125 mesh to 25 mesh. The clay is washed with distilled water several times to remove impurities. The clay is then dried in a vacuum oven overnight. Bentonite clay is milled to a size below 125 mesh and washed with distilled water several times to remove impurities. The clay is then dried in a vacuum oven overnight. The dried kaolin clay is composited with magnesite, bentonite, silica and cellulose powder with particles sized between 0.125 mm to 0.25 mm and mix for 180 minutes. Where, the composites were formulated by mixing of kaolin clay 63.476%, cellulose 1.544 wt %, silica 4.078 wt %, magnesite 9.546 wt % and bentonite 0.772 wt %. Then 20.584 wt % of water is added to the dry mixture and mixed again for 75 minutes then fed to an extruder at a temperature 18° C. The extrudate is collected in clean vessel, dried at different temperature levels, first it dried at 100° C. for one hour to evaporate the water, then increase the temperature up to 300° C. for one hour to remove any organic material, then increase the temperature up to 800° C. for one hour to make the reaction between the materials in the mixture and allow the materials to interact with each other's. Subsequently ground to granules of different sieve sizes, ranging from 0.125 mm to 0.25 mm. The resultant particles can be used as a new composite adsorbent.

The technical challenge for the invention was to find out the naturally available and low cost material for the treatment of waste water. There was no previous study carried out to use the new material composite as adsorbent for adsorption of metal ions from wastewater. This invention has overcome the technical difficulty by using naturally available materials in different concentration as adsorbent and to remove metal ions from waste water.

Therefore, cellulose, magnesite, silica and bentonite can be used to enhance the removal efficiency of Kaolin clay. Since the removal efficiency of kaolin was approximately 48.565%. So, by adding of kaolin clay 63.476%, cellulose 1.544 wt %, silica 4.078 wt %, magnesite 9.546 wt % and bentonite 0.772 wt % the overall efficiency in heavy metal removal from the process stream was increased (up to 100%). The adsorbent has ion exchange capacity and is useful in removing lead (Pb) from contaminated or waste water.

In an effort to increase the kaolin capacity as adsorbent for adsorption of heavy metals from waste water, the research leading to the present invention has discovered a new adsorbent composition for heavy metal ions which are dissolved in aqueous media and better adsorption capacity and removal efficiency than kaolin alone. The enhancement of adsorption capacity by preparing the cellulose, silica, magnesite, bentonite/kaolin clay composite is 51.44% as compare to kaolin alone and the enhancement in removal efficiency is 51.44%. In addition to the surface area and pore volume as shown in the below.

TABLE 2

Performance of the new composite compared to Kaolin

| Type | Maximum capacity (mg/g) | Removal efficiency (%) | BET surface area(m²/g) |
| --- | --- | --- | --- |
| Kaolin | 24.5 | 48.56 | 12.088 |
| New composite adsorbent | 50.45 | 100 | 19.672 |

TABLE 3

Performance of the Composite adsorbent compared to Kaolin alone:

| Adsorption capacity % Increase | Removal efficiency % Increase | Surface area % Increase | Pore volume % Increase | Pore diameter % Increase |
| --- | --- | --- | --- | --- |
| 51.44 | 51.44 | 38.552 | 40.087 | 3.203 |

In embodiments, an adsorbent composition for metal ions is disclosed comprising a granulated mixture of 63.476 wt % kaolin clay and cellulose, silica, magnesite and bentonite.

In order to enhance such excellent combination of kaolin clay particles within the cellulose, silica, magnesite and bentonite, it can be advantageous to incorporate between 20.584 wt % water, with the kaolin clay and cellulose, silica, magnesite and bentonite upon mixing.

One manner of making the new adsorbent composition is to mill kaolin clay to a size below 125 mesh and wash the clay particles with distilled water several times to remove impurities. The kaolin clay is then dried in a vacuum oven, e.g., overnight. Also, bentonite clay is milled to a size below 125 mesh and washes the clay particles with distilled water several times to remove impurities. The clay is then dried in a vacuum oven overnight. The dried kaolin clay is composited with magnesite, bentonite, silica and cellulose and water, the blended is placed in a mixer and then mixed to make a paste. The paste is collected after 255 minutes and then fed to an extruder at a temperature 18° C. The extrudate is collected in clean vessel, dried at different temperature levels, first it dried at 100° C. for one hour to evaporate the water, then increase the temperature up to 300° C. for one hour to remove any organic materials, then increase the temperature up to 800° C. for one hour to react the materials in the mixture and allow the materials to interact with each other's. Subsequently ground to granules of different sieve sizes, ranging from 0.125 mm to 0.25 mm. Then used as a new composite adsorbent.

The granulated adsorbent composition is then used as adsorbent for the removal of heavy metal ions, such as Copper (Cu), Chromium (Cr) and Lead (Pb), from industrial wastewater to obtain clean water for the development of landscape and industrial cooling. It has been observed that the removal efficiency was 100%, which is much less expensive as compared to other conventional technologies used for wastewater treatment for the removal of heavy metals.

The removal method can be enhanced by mixing the heavy-metal contaminated water with adsorbent composition. In embodiments, the solution being treated is maintained at a pH=4.5, and is treated for at least 4 hours at a room temperature or above.

The removal method, in embodiments, utilizes clay particles which have a naturally-occurring ion-exchange capacity, such as kaolin clay with cellulose 1.544 wt %, silica 4.078 wt %, magnesite 9.546 wt % and bentonite 0.772 wt %. The removal method is effective in removing heavy metals including lead, chromium, copper, zinc, cadmium and combinations thereof. It has been found that when the heavy metal is lead the concentration of lead in the water is reduced to be 100%.

EXAMPLE 1

Saudi kaolin clay was crushed and milled to a particle size below 125 mesh (particles sized between 0.125 mm to 0.25 mm), washed with distilled water several times and dried in a vacuum oven over night. One gram of Saudi kaolin clay were mixed with 1009 ppm Pb solution in a batch process as illustrated in FIG. 1, at 250 RPM, at a temperature of 25° C. and at pH between 4-4.5. After treatment the water (for 5 hours) was analyzed and found to contain 519 ppm of Pb ions, an essentially 48.56% removal efficiency.

EXAMPLE 2

Saudi kaolin clay was crushed and milled to a particle size below 125 mesh (particles sized between 0.125 mm to 0.25 mm), washed with distilled water several times and dried in a vacuum oven over night. One gram of Saudi kaolin clay were mixed with 998 ppm Cu solution in a batch process as illustrated in FIG. 1, at 250 RPM, at a temperature of 25° C. and at pH between 4-4.5. After treatment the water (for 4 hours)

was analyzed and found to contain 953 ppm of Cu ions, an essentially 4.51% removal efficiency.

EXAMPLE 3

Saudi kaolin clay in the form of soft rocks was received and milled to a particle size below 125 mesh (particles sized between 0.125 mm to 0.25 mm), washed with distilled water several times and dried in a vacuum oven over night. The dried clay particles were then dry blended with cellulose 1.544 wt %, silica 4.078 wt %, magnesite 9.546 wt %, bentonite 0.772 wt % and water 20.584 wt % The mixture was then placed in a mixer and then mixing to make a paste. The paste was dried, ground into particles sized between 0.125 mm to 0.25 mm. One gram of adsorbent particles were mixed with 1011 ppm Pb solution in a batch process as illustrated in FIG. 1, at 250 RPM, at a temperature of 25° C. and at pH between 4-4.5. After treatment the water (for 10 minutes) was analyzed and found to contain 76 ppm of Pb ions, an essentially 92.48% removal efficiency.

EXAMPLE 4

Saudi kaolin clay in the form of soft rocks was received and milled to a particle size below 125 mesh (particles sized between 0.125 mm to 0.25 mm), washed with distilled water several times and dried in a vacuum oven over night. The dried clay particles were then dry blended with cellulose 1.544 wt %, silica 4.078 wt %, magnesite 9.546 wt %, bentonite 0.772 wt % and water 20.584 wt %. The mixture was then placed in a mixer and then mixing to make a paste. The paste was dried, ground into particles sized between 0.125 mm to 0.25 mm. one gram of adsorbent particles were mixed with 1011 ppm Pb solution in a batch process as illustrated in FIG. 1, at 250 RPM, at a temperature of 25° C. and at pH between 4-4.5. After treatment the water (for 30 minutes) was analyzed and found to contain 66 ppm of Pb ions, an essentially 93.47% removal efficiency.

EXAMPLE 5

Saudi kaolin clay in the form of soft rocks was received and milled to a particle size below 125 mesh (particles sized between 0.125 mm to 0.25 mm), washed with distilled water several times and dried in a vacuum oven over night. The dried clay particles were then dry blended with cellulose 1.544 wt %, silica 4.078 wt %, magnesite 9.546 wt %, bentonite 0.772 wt % and water 20.584 wt %. The mixture was then placed in a mixer and then mixing to make a paste. The paste was dried, ground into particles sized between 0.125 mm to 0.25 mm. One gram of adsorbent particles were mixed with 1011 ppm Pb solution in a batch process as illustrated in FIG. 1, at 250 RPM, at a temperature of 25° C. and at pH between 4-4.5. After treatment the water (for 1 hour) was analyzed and found to contain 3.6 ppm of Pb ions, an essentially 99.64% removal efficiency.

EXAMPLE 6

Saudi kaolin clay in the form of soft rocks was received and milled to a particle size below 125 mesh (particles sized between 0.125 mm to 0.25 mm), washed with distilled water several times and dried in a vacuum oven over night. The dried clay particles were then dry blended with cellulose 1.544 wt %, silica 4.078 wt %, magnesite 9.546 wt %, bentonite 0.772 wt % and water 20.584 wt %. The mixture was then placed in a mixer and then mixing to make a paste. The paste was dried, ground into particles sized between 0.125 mm to 0.25 mm. One gram of adsorbent particles were mixed with 1011 ppm Pb solution in a batch process as illustrated in FIG. 1, at 250 RPM, at a temperature of 25° C. and at pH between 4-4.5. After treatment the water (for 3 hour) was analyzed and found to contain 1.1 ppm of Pb ions, an essentially 99.89% removal efficiency.

EXAMPLE 7

Saudi kaolin clay in the form of soft rocks was received and milled to a particle size below 125 mesh (particles sized between 0.125 mm to 0.25 mm), washed with distilled water several times and dried in a vacuum oven over night. The dried clay particles were then dry blended with cellulose 1.544 wt %, silica 4.078 wt %, magnesite 9.546 wt %, bentonite 0.772 wt % and water 20.584 wt %. The mixture was then placed in a mixer and then mixing to make a paste. The paste was dried, ground into particles sized between 0.125 mm to 0.25 mm. One gram of adsorbent particles were mixed with 1009 ppm Pb solution in a batch process as illustrated in FIG. 1, at 250 RPM, at a temperature of 25° C. and at pH between 4-4.5. After treatment the water (for 4 hours) was analyzed and found to contains 0 ppm of Pb ions, an essentially 100% removal efficiency.

EXAMPLE 8

The dried kaolin clay particles of Example 3 were dry blended cellulose 1.544 wt %, silica 4.078 wt %, magnesite 9.546 wt %, bentonite 0.772 wt % and water 20.584 wt %. The mixture was then placed in a mixer and then mixing to make a paste. The paste collected was dried, ground into particles sized between 0.125 mm to 0.25 mm. One gram of adsorbent particles were combined with 50 mL water contaminated with 1009 ppm Pb, in a batch process as illustrated in FIG. 1, at 250 RPM, at a temperature of 25° C. and at pH between 4-4.5. After treatment the water (for 4 hours) was analyzed and found to contain 0 ppm of Pb ions, an essentially 100% removal efficiency.

EXAMPLE 9

Saudi kaolin clay in the form of soft rocks was received and milled to a particle size below 125 mesh (particles sized between 0.125 mm to 0.25 mm), washed with distilled water several times and dried in a vacuum oven over night. The dried clay particles were then dry blended with cellulose 1.544 wt %, silica 4.078 wt %, magnesite 9.546 wt %, bentonite 0.772 wt % and water 20.584 wt %. The mixture was then placed in a mixer and then mixing to make a paste. The paste was dried, ground into particles sized between 0.125 mm to 0.25 mm. One gram of adsorbent particles were mixed with 980 ppm Cu solution in a batch process as illustrated in FIG. 1, at 250 RPM, at a temperature of 25° C. and at pH between 4-4.5. After treatment the water (for 10 minutes) was analyzed and found to contain 103 ppm of Pb ions, an essentially 89.49% removal efficiency.

EXAMPLE 10

Saudi kaolin clay in the form of soft rocks was received and milled to a particle size below 125 mesh (particles sized between 0.125 mm to 0.25 mm), washed with distilled water several times and dried in a vacuum oven over night. The dried clay particles were then dry blended with cellulose 1.544 wt %, silica 4.078 wt %, magnesite 9.546 wt %, bentonite 0.772 wt % and water 20.584 wt %. The mixture was then placed in a mixer and then mixing to make a paste. The paste was dried, ground into particles sized between 0.125 mm to 0.25 mm. One gram of adsorbent particles were mixed with 980 ppm Cu solution in a batch process as illustrated in FIG. 1, at 250 RPM, at a temperature of 25° C. and at pH between 4-4.5. After treatment the water (for 30 minutes) was analyzed and found to contain 102.7 ppm of Pb ions, an essentially 89.52% removal efficiency.

EXAMPLE 11

Saudi kaolin clay in the form of soft rocks was received and milled to a particle size below 125 mesh (particles sized between 0.125 mm to 0.25 mm), washed with distilled water several times and dried in a vacuum oven over night. The dried clay particles were then dry blended with cellulose 1.544 wt %, silica 4.078 wt %, magnesite 9.546 wt %, bentonite 0.772 wt % and water 20.584 wt %. The mixture was then placed in a mixer and then mixing to make a paste. The paste was dried, ground into particles sized between 0.125 mm to 0.25 mm. One gram of adsorbent particles were mixed with 980 ppm Cu solution in a batch process as illustrated in FIG. 1, at 250 RPM, at a temperature of 25° C. and at pH between 4-4.5. After treatment the water (for 3 hours) was analyzed and found to contains 102 ppm of Pb ions, an essentially 89.59% removal efficiency.

EXAMPLE 12

Saudi kaolin clay in the form of soft rocks was received and milled to a particle size below 125 mesh (particles sized between 0.125 mm to 0.25 mm), washed with distilled water several times and dried in a vacuum oven over night. The dried clay particles were then dry blended with cellulose 1.544 wt %, silica 4.078 wt %, magnesite 9.546 wt %, bentonite 0.772 wt % and water 20.584 wt %. The mixture was then placed in a mixer and then mixing to make a paste. The paste was dried, ground into particles sized between 0.125 mm to 0.25 mm. One gram of adsorbent particles were mixed with 980 ppm Cu solution in a batch process as illustrated in FIG. 1, at 250 RPM, at a temperature of 25° C. and at pH between 4-4.5. After treatment the water (for 4 hours) was analyzed and found to contains 101.9 ppm of Pb ions, an essentially 89.60% removal efficiency. The enhancement in the surface area after preparing the composite adsorbent is 38.552% in comparison with kaolin alone. The enhancement in pore volume after preparing the composite adsorbent is 40.087% in comparison with kaolin alone. The enhancement in average pore diameter after preparing the composite adsorbent is 3.203% in comparison with kaolin alone.

The foregoing examples have been provided for the purpose of explanation and should not be construed as limiting the present invention. While the present invention has been described with reference to an exemplary embodiment, changes may be made within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims. In addition, the specification and drawings are to be regarded in an illustrative rather than as in a restrictive sense.

What is claimed is:
1. An adsorbent composition, comprising:
a granulated mixture of a kaolin clay, cellulose powder, silica powder, magnesite powder, bentonite powder and water having a specific particle size, made at a specific pH to remove metal ions from a waste water wherein the kaolin clay is 63.476 wt %, cellulose powder 1.544 wt %, silica powder 4.078 wt %, magnesite powder 9.546 wt %, bentonite powder 0.772 wt % and water 20.584 wt %.

2. The adsorbent of claim 1, wherein the specific particle size is between 0.125 mm to 0.25 mm.

3. The adsorbent of claim 1, wherein the pH is between 4-4.5 pH.

4. The adsorbent of claim 1, wherein the metal ions is at least of a lead, chromium, copper, zinc, cadmium and combinations thereof.

5. The adsorbent of claim 4, wherein the metal ions is Lead (Pb).

6. The adsorbent composition of claim 1, wherein the adsorbent has an ion-exchange capacity.

7. A method for removing heavy metals from contaminated water, comprising:
mixing a water having a specific concentration of one or more heavy metals with an adsorbent composition comprising a kaolin clay, cellulose powder, silica powder, magnesite powder, bentonite powder and water at a specific rpm and a specific temperature; and collecting water having a reduced percentage concentration of the one or more heavy metals; wherein the kaolin clay is 63.476 wt %, cellulose powder 1.544 wt %, silica powder 4.078 wt %, magnesite powder 9.546 wt %, bentonite powder 0.772 wt % and water 20.584 wt %.

8. The method of claim 7, wherein the process is conducted at a pH 4-5.

9. The method of claim 7, wherein the mixing step is conducted at the pH 4.5.

10. The method of claim 7, wherein the one or more heavy metal is selected from the group consisting of a lead, chromium, copper, zinc, cadmium and combinations thereof.

11. The method of claim 10, wherein the heavy metal is lead.

12. The method of claim 11, wherein the reduced percentage concentration of lead in the water is 100%.

13. The method of claim 7, wherein a concentration of the one or more heavy metals in the water is between 980 ppm to 1011 ppm.

14. The method of claim 7, wherein the copper concentration in the water is reduced by at least 89.60%.

15. A method of making an adsorbent, comprising:
milling a kaolin clay to a size 125 mesh particles;
washing the kaolin clay particles with a distilled water several times to remove impurities;
drying the kaolin clay in a vacuum oven overnight to obtain a dried kaolin clay particle;
milling a bentonite clay to a size 125 mesh particles;
washing the bentonite clay particles with a distilled water several times to remove impurities;
drying the bentonite clay overnight in a vacuum oven;
composting dried kaolin clay particle with a magnesite, bentonite, silica and cellulose and water to obtain a composted mixture;
blending the composted mixture using a blender to make a paste;
collecting the paste after 255 minutes and feeding to an extruder at a temperature 18° C. and collecting an extrudate; and drying the extrudate at different temperatures to obtain a new composite adsorbent.

16. The method of claim 15, further comprising grinding the new composite adsorbent to a particle range of 0.125 mm to 0.25 mm.

17. The method of claim 16, wherein the particle size is 0.125 mm.

18. The method of claim 15, wherein the temperature is at least one of 100° C., 300° C. and 800° C.

* * * * *